(12) United States Patent
Nordbruch

(10) Patent No.: US 10,501,073 B2
(45) Date of Patent: Dec. 10, 2019

(54) CONTROLLING A MOTOR VEHICLE

(71) Applicant: Robert Bosch GmbH, Stuttgart (DE)

(72) Inventor: Stefan Nordbruch, Kornwestheim (DE)

(73) Assignee: Rovert Bosch GmbH, Stuttgart (DE)

( * ) Notice: Subject to any disclaimer, the term of this patent is extended or adjusted under 35 U.S.C. 154(b) by 165 days.

(21) Appl. No.: 15/577,856

(22) PCT Filed: May 9, 2016

(86) PCT No.: PCT/EP2016/060285
§ 371 (c)(1),
(2) Date: Nov. 29, 2017

(87) PCT Pub. No.: WO2016/202499
PCT Pub. Date: Dec. 22, 2016

(65) Prior Publication Data
US 2018/0134283 A1 May 17, 2018

(30) Foreign Application Priority Data
Jun. 17, 2015 (DE) .......................... 10 2015 211 133

(51) Int. Cl.
*B60W 30/085* (2012.01)
*B60W 30/09* (2012.01)
*B60W 30/08* (2012.01)

(52) U.S. Cl.
CPC .......... *B60W 30/085* (2013.01); *B60W 30/09* (2013.01); *B60W 2030/082* (2013.01); *B60W 2540/10* (2013.01); *B60W 2540/18* (2013.01); *B60W 2540/26* (2013.01)

(58) Field of Classification Search
CPC ............... B60W 30/085; B60W 30/09; B60W 2030/082; B60W 2540/00; B60W 2540/10; B60W 2540/18; B60W 2540/26
See application file for complete search history.

(56) References Cited

U.S. PATENT DOCUMENTS

| 2008/0195261 A1* | 8/2008 | Breed ................. B60R 21/0132 701/2 |
| 2014/0303827 A1 | 10/2014 | Dolgov et al. |
| 2014/0350790 A1 | 11/2014 | Akesson et al. |

FOREIGN PATENT DOCUMENTS

| DE | 102012112802 A1 | 6/2014 |
| DE | 102013201796 A1 | 8/2014 |
| DE | 102014212962 A1 | 1/2015 |
| JP | H10309961 A | 11/1998 |
| JP | H10329575 A | 12/1998 |

OTHER PUBLICATIONS

International Search Report dated Jul. 26, 2016, of the corresponding International Application PCT/EP2016/060285 filed May 9, 2016.

* cited by examiner

*Primary Examiner* — Calvin Cheung
(74) *Attorney, Agent, or Firm* — Norton Rose Fulbright US LLP; Gerard Messina

(57) ABSTRACT

A method for controlling a motor vehicle includes driver-independently guiding the motor vehicle on a road, detecting an accident situation of the motor vehicle, detecting an attempt by the driver to intervene into the vehicle guidance, determining that the attempt to intervene is not an attempt to guide, and maintaining the guidance of motor vehicle.

9 Claims, 2 Drawing Sheets

CONTROLLING A MOTOR VEHICLE

FIELD

The present invention relates to the control of a motor vehicle. In particular, the present invention relates to the control of a motor vehicle with the aid of a highly automated function in or after an accident situation.

BACKGROUND INFORMATION

A motor vehicle may be controlled with the aid of a highly automated function (HAF). In particular, the motor vehicle may be guided driver-independently on a road. In this case, a driver of the motor vehicle may devote his attention to an activity other than that of monitoring the motor vehicle. At present, the automated guidance of a motor vehicle, in which the driver is not available as a fallback support, is already possible under certain conditions.

A control method for the motor vehicle may become involved in an accident situation that is independent of the quality of the control method. The accident situation may be triggered, for example, by a person unexpectedly crossing the road or another motor vehicle behaving in a non-compliant manner. A control system for the motor vehicle is usually overwhelmed by the accident situation and will attempt to return the control of the motor vehicle to the driver. A predetermined maximum transfer time is established in this case predetermined, however, during which the automated guidance of the motor vehicle must be maintained. Even after a takeover or after the motor vehicle has collided with an object, attempts by the driver to intervene in the guidance of the motor vehicle may be carried out spontaneously or automatically.

SUMMARY

An object of the present invention is to provide an improved guidance of a motor vehicle in an accident situation.

In accordance with the present invention, an example method is provided for controlling a motor vehicle, the method includes steps of driver-independently guiding the motor vehicle on a road, detecting an accident situation of the motor vehicle, detecting an attempt by the driver to intervene in the vehicle guidance, determining that the attempt to intervene is not an attempt to guide, and maintaining the guidance of the motor vehicle.

The attempt by the driver to intervene may take place unintentionally, for example, as a result of the motor vehicle colliding with an object. The driver may be propelled, as a result, in such a way that he/she automatically or unintentionally engages with a control component which influences the guidance or the control of the motor vehicle. If such an attempt to intervene is determined, the guidance may not be transferred to the driver, but rather may be continued by the method. A potentially harmful intervention by the driver into the guidance of the motor vehicle may be prevented as a result.

In one specific embodiment, the guidance is maintained and includes changing a guidance objective to a preferably great protective function. Another guidance objective, for example a comfortable or rapid transport of the passengers of the motor vehicle, may be disabled or assigned a lower priority in this case.

The attempt to intervene may include an actuation of an immediately effective control component of the motor vehicle and the maintenance of the guidance may include the effectuation of a counterforce on the control component.

The driver may usually take over the guidance of the motor vehicle at any point in time by operating a control component of the motor vehicle. If an actuation of a control component does not represent an attempt to guide, however, and takes place, for example, due to the driver being tossed around in the motor vehicle, the effect of the control component on the guidance of the motor vehicle may be prevented by way of the effectuation of the counterforce. In this way, in particular, a change of course ("veering") of the motor vehicle may be prevented.

The control component may include, in particular, a drive engine, a brake, or a steering system. In general, the control component may control a longitudinal or transverse movement of the motor vehicle. Other control components are also possible, for example, a gear selector lever.

In one specific embodiment, the accident situation includes a collision of the motor vehicle with an object. In this case, the object may include, for example, a person, a motor vehicle, or a stationary fixture on the road. Another object may also be involved in the accident with the motor vehicle, however, such as an animal, for example. In yet another specific embodiment, the accident situation is determined when a collision of the motor vehicle with an object will likely take place before a maximum time predetermined for the transfer of the guidance of the motor vehicle to the driver has elapsed. If a pedestrian suddenly crosses the road ahead of the motor vehicle, for example, and therefore a collision cannot be avoided even with the aid of a full application of the brakes and/or evasive maneuvering, it may be determined when the collision is likely to take place. A maximum time for the transfer of the guidance to the driver may be fixedly predefined or may be dependent on parameters. Eight to ten seconds are common, for example, during highway travel. If the collision should take place before the maximum transfer time has elapsed it may be assumed that the driver may not be able to make a meaningful contribution to the collision avoidance, to the mitigation of collision damage, or to the control of the motor vehicle after the collision. In this case, the accident situation may be already determined before the collision with the object has taken place.

In one specific embodiment, the attempt to intervene is evaluated on the basis of an observation of the driver. For example, it may be observed that the driver is tossed out of a resting position about the motor vehicle and, as a result, acts upon the steering wheel. In this case, the steering wheel intervention may be evaluated as no attempt to guide.

In yet another specific embodiment, a level of attentiveness of the driver may be determined before the accident situation is determined and an attempt by the driver to intervene within a period of time determined on the basis of the level of attentiveness may be determined not to be an attempt to guide. In other words, the driver may be granted a takeover time which is dependent on his/her level of attentiveness. An attempt by the driver to intervene during this takeover time may be determined not to be an attempt to guide.

It is preferred that, in response to the determined accident situation, a prompt is output to the driver to take over the guidance of the motor vehicle. This prompt may be output, in particular, visually, acoustically, or haptically.

In addition, it is preferred that, in response to the determined accident situation, the guidance of the motor vehicle takes place in preparation for a collision of the motor vehicle with an object. The objective of the control of the motor vehicle guidance may be shifted from that of comfortably carrying the driver and, possibly, other persons on board the motor vehicle, to providing a preferably high level of protection of persons and/or material within or outside the motor vehicle. The guidance objective may include avoiding a collision and avoiding a secondary collision. In addition, the guidance objective may include mitigating the consequences of a collision.

In accordance with the present invention, a computer program product includes program code for carrying out the above-described method when the computer program product runs on a processing unit or is stored on a machine-readable data carrier.

In accordance with the present invention, a control device for controlling a motor vehicle is configured for guiding the motor vehicle driver-independently on a road. In this case, the control device includes a first scanning unit for detecting an accident situation of the motor vehicle, a second scanning unit for detecting an attempt by the driver to intervene into the vehicle guidance, and a processing unit configured for determining that the attempt to intervene is not an attempt to guide, and for maintaining the guidance of the motor vehicle.

The present invention is described in greater detail below with reference to the figures.

DETAILED DESCRIPTION OF EXAMPLE EMBODIMENTS

Figure 1:
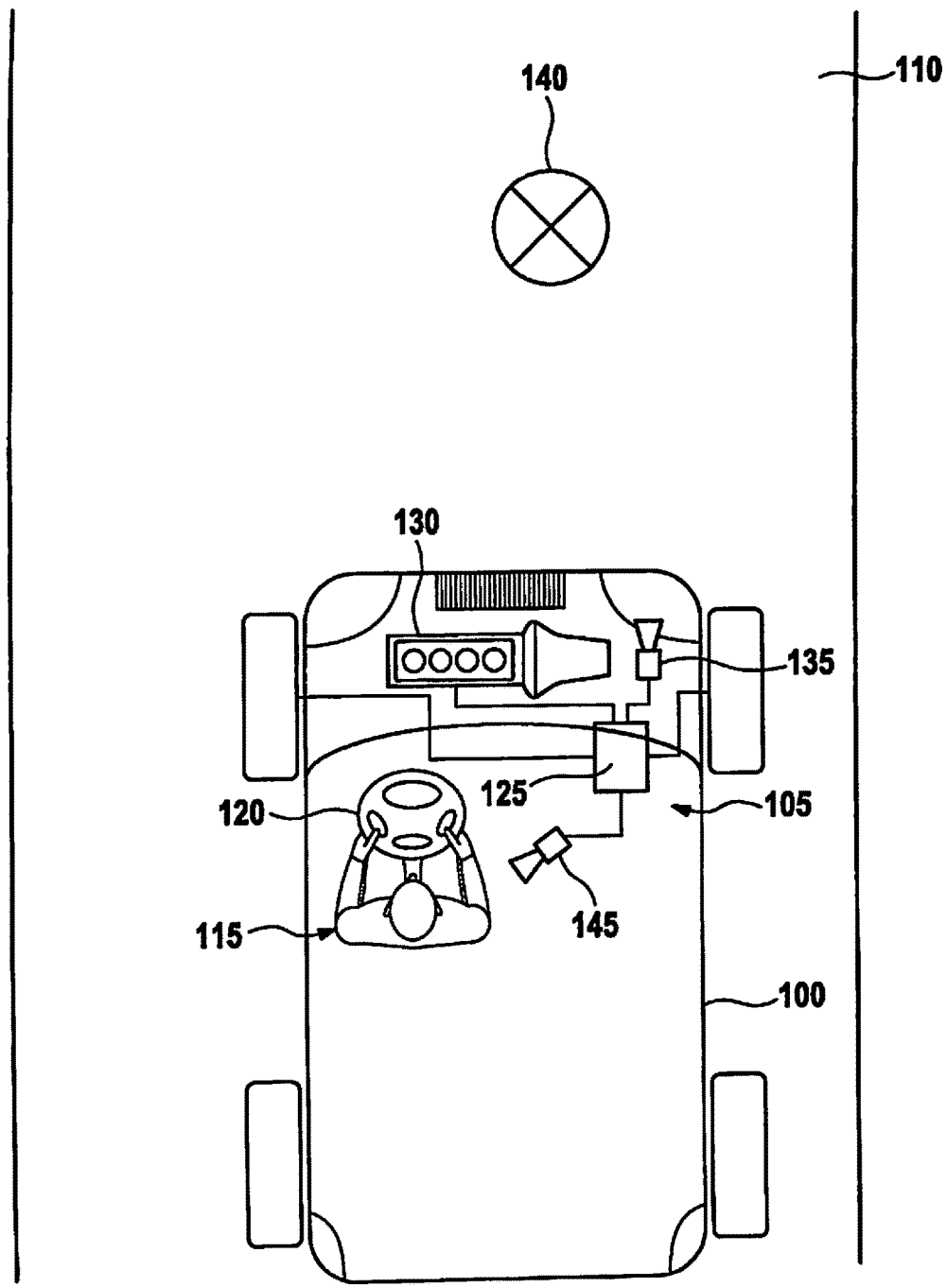
FIG. 1 shows a motor vehicle including a highly automated function.

FIG. 1 shows a motor vehicle 100 including a control device 105. Control device 105 is configured for guiding motor vehicle 100 on a road 110 independently of a driver 115. Such a function is known as a highly automated function (HAF). In this case, driver 115 no longer monitors the function of control device 105 and may devote his attention explicitly to an activity other than that of guiding or monitoring the guidance of motor vehicle 100. In this case, control device 105 must be able to respond to any situation of motor vehicle 100 in a suitable manner. If control device 105 should no longer be able to perform its task with a sufficient level of safety, it is provided to prompt driver 115 to take over and to grant him/her a predetermined amount of time to take over the guidance. During this takeover time, control device 105 must be able to continue guiding motor vehicle 100. The takeover usually takes place by way of driver 115 actuating a control component 120 which immediately acts upon the movement of motor vehicle 100. In the representation from FIG. 1, control component 120 includes, by way of example, a steering wheel; in other specific embodiments, however, control component 120 may also include a foot pedal, an operating or selector lever, a switch, or a button. Control component 120 generally acts on a longitudinal or transverse movement of motor vehicle 100.

Control device 105 includes a processing unit 125 which is configured for carrying out a longitudinal and transverse guidance of motor vehicle 100. For this purpose, the control device is connected, by way of example, to steerable wheels of motor vehicle 100 and to a drive engine 130 in the representation from FIG. 1. Furthermore, processing unit 125 may also be connected to brakes of motor vehicle 100. A first scanning unit 135 for monitoring surroundings of motor vehicle 100 is usually provided. Multiple scanning units 135 may also be provided, and different technologies may be utilized, such as, for example, radar sensors, LIDAR systems, ultrasonic sensors, or video systems.

Processing unit 125 may detect an intervention by driver 115 into the guidance of motor vehicle 100, for example, by way of the fact that control components such as steering wheel 120 or drive engine 130 are influenced by a source other than processing device 125. During a usual driving operation, a transfer of the guidance of motor vehicle 100 to driver 115 then takes place.

Processing unit 125 is preferably configured for determining whether motor vehicle 100 is in an accident situation. The accident situation may be determined when a collision with an object 140 has already taken place or is likely no longer able to be avoided. A transfer of the control of motor vehicle 100 from control device 105 to driver 115 may be problematic in a time period immediately before, during, or after a collision of motor vehicle 100 with object 140. In order to increase the safety of motor vehicle 100, of driver 115, or of object 140, control device 105 may attempt, during an accident situation, to effectuate a maximum amount of protection for driver 115, motor vehicle 100, or object 140. For this purpose, the control objective of— usually preferably comfortably and rapidly—traveling on road 110 may be changed to that of preferably efficiently protecting driver 115, motor vehicle 100, or object 140.

In addition, the transfer of the guidance of motor vehicle 100 from control device 105 to driver 115 may be handled in a way other than in a usual operating mode of control device 105. In order to prevent the situation in which driver 115 intervenes in the guidance of motor vehicle 100 due being unaware or panic, or automatically, without intending an attempt to guide motor vehicle 100, it is provided to observe driver 115 and to transfer the guidance of motor vehicle 100 to the driver only when he/she makes a convincing attempt to guide. In order to monitor driver 115, a second scanning unit 145 may be provided, which may include, for example, a camera directed at driver 115. With the aid of second scanning unit 145, in one specific embodiment, a level of attentiveness of driver 115 may also be determined before an accident situation of motor vehicle 100, the level of attentiveness being used as the basis for a subsequent evaluation of an intervention by driver 115 into a control component 120. Furthermore, it may be determined, for example, by way of second scanning unit 145, whether a steering intervention by driver 115 has taken place merely because driver 115 is being tossed around in motor vehicle 100.

If it is determined that an attempt by driver 115 to intervene into the guidance of motor vehicle 100 does not represent an attempt to guide, it is provided that control device 105 continues to control motor vehicle 100. The attempt by driver 115 to intervene into control component 120 may be counteracted, for example, by way of processing unit 125. Since driver 115 as well as processing unit 125 may influence the longitudinal or transverse control of motor vehicle 100, an influence which opposes the influence by driver 115 may be effectuated by processing unit 125 in order to compensate for the influence by the driver. In yet another specific embodiment, the attempt by driver 115 to intervene may be ignored.

Figure 2:
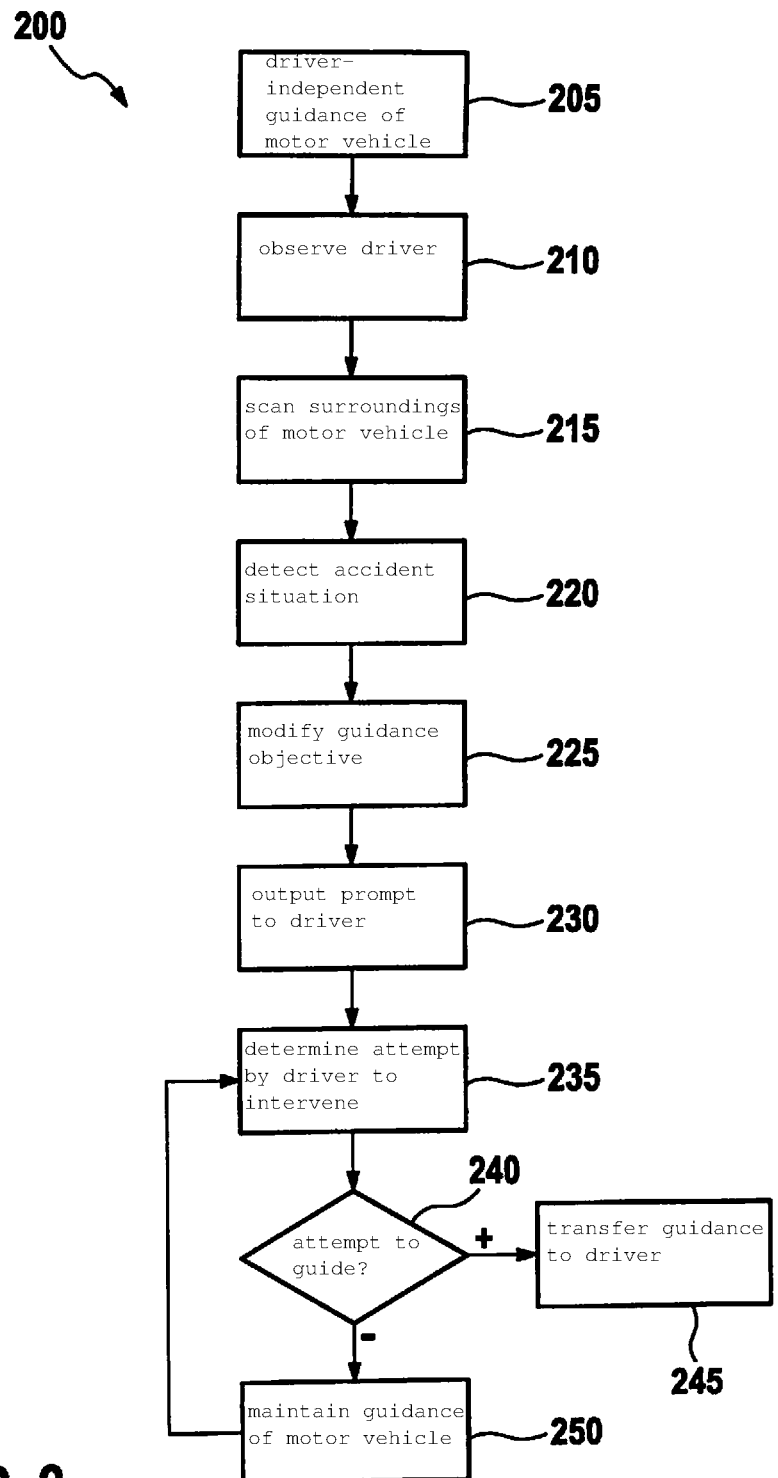
FIG. 2 shows a flow chart of a method for controlling the motor vehicle from FIG. 1.

FIG. 2 shows a flow chart of a method 200 for controlling motor vehicle 100 from FIG. 1. Method 200 is configured to be run on control device 105 and, in particular, on processing unit 125.

In a first step 205, a driver-independent guidance of motor vehicle 100 takes place, as described in greater detail above. Optionally, in a step 210, driver 115 may be observed, for example with the aid of second scanning unit 145, and a level of attentiveness of driver 115 may be determined.

In a step 215, surroundings of motor vehicle 100 are scanned. The scanning usually takes place already within the scope of step 205, although it is listed separately here, since it is the basis for detecting an accident situation, which takes place in a subsequent step 220. Thereupon, in an optional step 225, a guidance objective of step 205 may be modified in order to preferably maximize the safety of motor vehicle 100, of driver 115, or of object 140. In addition, in response to the determination of the accident situation, a prompt is output to driver 115, preferably in a step 230, in order to motivate the driver to take over the guidance of motor vehicle 100.

In a step 235, an attempt by driver 115 to intervene is determined. The attempt to intervene may be determined, in particular, on the basis of the actuation of a control component for influencing the longitudinal or transverse movement of motor vehicle 100. In a subsequent step 240, it is determined whether the attempt to intervene is also an attempt to guide. If a level of attentiveness of driver 115 was determined in step 210, a transition time may be determined on the basis of the level of attentiveness; the transition time is that much longer, the less attentive driver 115 was at the point in time when the determination was made. During the transition time, any intervention by driver 115 may be determined to be automatic, inadvertent, or spontaneous, and therefore an attempt to guide is not present.

If there is an attempt to guide, the guidance of motor vehicle 100 is transferred to driver 115 in a step 245. If it is determined in step 240, however, that an attempt to guide is not present, the guidance of motor vehicle 100 is maintained in a step 250. Subsequently, method 200 may return to step 235 and start over again.

What is claimed is:

1. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein the guidance is maintained and includes changing a guidance objective to a great protective function.

2. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein the attempt to intervene includes an actuation of an immediately effective control component of the motor vehicle and the maintenance of the guidance includes effectuation of a counterforce on the control component.

3. The method as recited in claim 2, wherein the control component includes one of a drive engine, a brake, or a steering system.

4. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein the accident situation includes a collision of the motor vehicle with an object.

5. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein the accident situation is detected when a collision of the motor vehicle with an object will likely take place before a maximum time predetermined for the transfer of the guidance of the motor vehicle to the driver has elapsed.

6. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein the attempt to intervene is evaluated based on an observation of the driver.

7. The method as recited in claim 6, wherein a level of attentiveness of the driver is determined before the accident situation is determined and an attempt by the driver to intervene within a period of time determined based on the level of attentiveness is determined not to be an attempt to guide.

8. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein, in response to the detected accident situation, a prompt is output to the driver to take over the guidance of the motor vehicle.

9. A method for controlling a motor vehicle, comprising:
driver-independently guiding the motor vehicle on a road;
detecting an accident situation of the motor vehicle;
detecting an attempt by the driver to intervene into the vehicle guidance;
determining that the attempt to intervene is not an attempt to guide; and
maintaining the guidance of motor vehicle;
wherein, in response to the detected accident situation, the guidance of the motor vehicle takes place in preparation for a collision of the motor vehicle with an object.

* * * * *